United States Patent
Vogel et al.

(10) Patent No.: US 11,015,456 B2
(45) Date of Patent: May 25, 2021

(54) NEAR WALL LEADING EDGE COOLING CHANNEL FOR AIRFOIL

(71) Applicant: Power Systems Mfg., LLC, Jupiter, FL (US)

(72) Inventors: Gregory Edwin Vogel, Palm Beach Gardens, FL (US); Vladimir Kitaigorod, Wellington, FL (US)

(73) Assignee: POWER SYSTEMS MFG., LLC

( * ) Notice: Subject to any disclaimer, the term of this patent is extended or adjusted under 35 U.S.C. 154(b) by 67 days.

(21) Appl. No.: 16/417,006

(22) Filed: May 20, 2019

(65) Prior Publication Data

US 2020/0370436 A1 Nov. 26, 2020

(51) Int. Cl.
*F01D 5/18* (2006.01)
*B33Y 80/00* (2015.01)

(52) U.S. Cl.
CPC .............. *F01D 5/187* (2013.01); *B33Y 80/00* (2014.12); *F01D 5/186* (2013.01); *F05D 2230/31* (2013.01); *F05D 2260/202* (2013.01)

(58) Field of Classification Search
None
See application file for complete search history.

(56) References Cited

U.S. PATENT DOCUMENTS

| | | | | |
|---|---|---|---|---|
| 5,486,093 | A * | 1/1996 | Auxier | F01D 5/186 416/97 R |
| 7,306,026 | B2 * | 12/2007 | Memmen | F01D 5/147 164/516 |
| 8,109,725 | B2 * | 2/2012 | Abdel-Messeh | F01D 5/14 416/96 R |
| 10,352,181 | B2 * | 7/2019 | Vogel | F01D 25/12 |
| 2010/0119377 | A1 * | 5/2010 | Tibbott | F01D 5/186 416/97 R |

* cited by examiner

*Primary Examiner* — Michael Lebentritt
*Assistant Examiner* — Jason G Davis
(74) *Attorney, Agent, or Firm* — Hovey Williams LLP

(57) ABSTRACT

Airfoils, gas turbine engine assemblies including such airfoils, and methods of manufacturing the same. The airfoil includes multiple cooling channels proximate a leading edge of the airfoil, each of the cooling channels including an inlet provided on one an inner surface of the airfoil in one of the pressure side wall and the suction side wall, and an outlet provided on an outer surface of the airfoil in the other of the pressure side wall and the suction side wall. The cooling channels are arranged in a staggered configuration such there is an alternate pattern of cooling fluid flow provided at the leading edge of the airfoil, near the airfoil's stagnation point.

19 Claims, 9 Drawing Sheets

NEAR WALL LEADING EDGE COOLING CHANNEL FOR AIRFOIL

TECHNICAL FIELD

The present invention relates to turbine airfoils, and more particularly, to cooling circuits incorporated into turbine airfoils.

BACKGROUND OF THE INVENTION

A typical gas turbine engine is comprised of three main sections: a compressor section, a combustor section, and a turbine section. When in a standard operating cycle, the compressor section is used to pressurize air supplied to the combustor section. In the combustor section, a fuel is mixed with the pressurized air from the compressor section and is ignited in order to generate high temperature and high velocity combustion gases. These combustion gases then flow into a multiple stage turbine, where the high temperature gas flows through alternating rows of rotating and stationary gas turbine airfoils. The rows of stationary vanes are typically used to redirect the flow of combustion gases onto a subsequent stage of rotating blades. The turbine section is coupled to the compressor section along a common axial shaft, such that the turbine section drives the compressor section.

The air and hot combustion gases are directed through a turbine section by turbine blades and vanes. These blades and vanes are subject to extremely high operating temperatures, often exceeding the material capability from which the blades and vanes are made. Extreme temperatures can also cause thermal growth in the components, thermal stresses, and can lead to durability shortfall. In order to lower the effective operating temperature, the blades and vanes are cooled, often with air or steam. However, the cooling must occur in an effective way so as to use the cooling fluid efficiently. As a result, an improved cooling design for airfoils in gas turbines that addresses these issues, among others, is needed.

BRIEF SUMMARY OF THE INVENTION

In brief, and at a high level, the subject matter of this application relates generally to cooling passages, channels, and chambers incorporated into gas turbine airfoils. A gas turbine airfoil is comprised of an airfoil wall that includes an inner surface and an outer surface, and that forms an airfoil chamber that is at least partially enclosed by the airfoil wall. Embodiments provide for cooling channels formed in a leading edge of the airfoil wall for improved cooling of the airfoil. The cooling channels allow for cooling fluid or air to pass through the airfoil chamber and the airfoil wall, cooling the airfoil during operation of the gas turbine.

One embodiment of the instant invention is directed to an airfoil for a gas turbine having a leading edge and a trailing edge. The airfoil includes an airfoil wall having a pressure side and a suction side, the pressure side including a pressure side inner surface and a pressure side outer surface, and the suction side including a suction side inner surface and a suction side outer surface. The pressure side inner surface and the suction side inner surface together define an inner surface of the airfoil wall, and the pressure side outer surface and the suction side outer surface together defining an outer surface of the airfoil wall, with inner surface of the airfoil wall at least partially defining an airfoil chamber at least partially enclosed within the airfoil wall. The airfoil includes a plurality of first and second cooling channels proximate the leading edge of the airfoil, each of the first cooling channels including an inlet at a first opening provided on the pressure side inner surface and an outlet at a second opening provided on the suction side outer surface, and each of the second cooling channels including an inlet at a third opening provided on the suction side inner surface and an outlet at a fourth opening provided on the pressure side outer surface.

In some embodiments, the plurality of first cooling channels includes an upper first cooling channel and a lower first cooling channel, and the plurality of second cooling channels includes an upper second cooling channel and a lower second cooling channel. The plurality of first cooling channels and the plurality of second cooling channels are arranged in a staggered configuration such that the upper second cooling channel is located between, in a radial direction of the airfoil, the upper first cooling channel and the lower first cooling channel, and such that the lower first cooling channel is located between, in the radial direction of the airfoil, the upper second cooling channel and the lower second cooling channel.

Other embodiments of the instant invention are directed to a gas turbine assembly including a plurality of airfoils. Each of the plurality of airfoils includes a plurality of first and second cooling channels, as discussed above. In some embodiments, each of the plurality of airfoils include the plurality of first and second cooling channels in a staggered configuration, as discussed above.

Still other embodiments are directed to a method of manufacturing airfoils. The method includes forming, using additive manufacturing, an airfoil wall having a pressure side and a suction side. The pressure side includes a pressure side inner surface and a pressure side outer surface, and the suction side includes a suction side inner surface and a suction side outer surface. The pressure side inner surface and the suction side inner surface together define an inner surface of the airfoil wall, and the pressure side outer surface and the suction side outer surface together define an outer surface of the airfoil wall. The inner surface of the airfoil wall at least partially defines an airfoil chamber at least partially enclosed within the airfoil wall. The method further includes forming a plurality of first cooling channels proximate the leading edge of each airfoil, each of the first cooling channels including an inlet at a first opening provided on the pressure side inner surface and an outlet at a second opening provided on the suction side outer surface, and forming a plurality of second cooling channels proximate the leading edge of the airfoil, each of the second cooling channels including an inlet at a third opening provided on the suction side inner surface and an outlet at a fourth opening provided on the pressure side outer surface. The plurality of first cooling channels and the plurality of second cooling channels provide fluid communication between the airfoil chamber and an exterior of the airfoil wall.

In some embodiments, the method includes staggering the plurality of first and second cooling channels. In such embodiments, the plurality of first cooling channels includes an upper first cooling channel and a lower first cooling channel, and the plurality of second cooling channels includes an upper second cooling channel and a lower second cooling channel. The method includes staggering the plurality of first cooling channels and the plurality of second cooling channels such that the upper second cooling channel is provided between, in a radial direction of the airfoil, the upper first cooling channel and the lower first cooling channel, and such that the lower first cooling channel is provided between, in the radial direction of the airfoil, the upper second cooling channel and the lower second cooling channel.

The cooling channels described in this disclosure are discussed frequently in the context of gas turbine airfoils but may be used in any type of airfoil structure. Additionally, cooling fluid, gas, air, and/or airflow may be used interchangeably in this disclosure, and refer to any cooling medium that can be sent through an airfoil to provide heat transfer and cooling of the airfoil.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

At a high level, the subject matter of this application generally relates to an airfoil for a gas turbine that includes cooling circuits integrated in various configurations. The airfoil may generally include an airfoil wall with an inner surface and an outer surface that at least partially encloses an airfoil chamber. Cooling circuits may be formed in various locations in the airfoil wall, to provide enhanced heat transfer from the airfoil when the gas turbine is in operation and cooling fluid or gas is passing through the cooling circuits. For turbine hardware operating in harsh environments, the use of this airfoil cooling technology is fully contemplated to be adapted to additional components such as outer and inner diameter platforms, blade outer or inner air shields, or alternative high temperature turbine components.

Figure 1A:
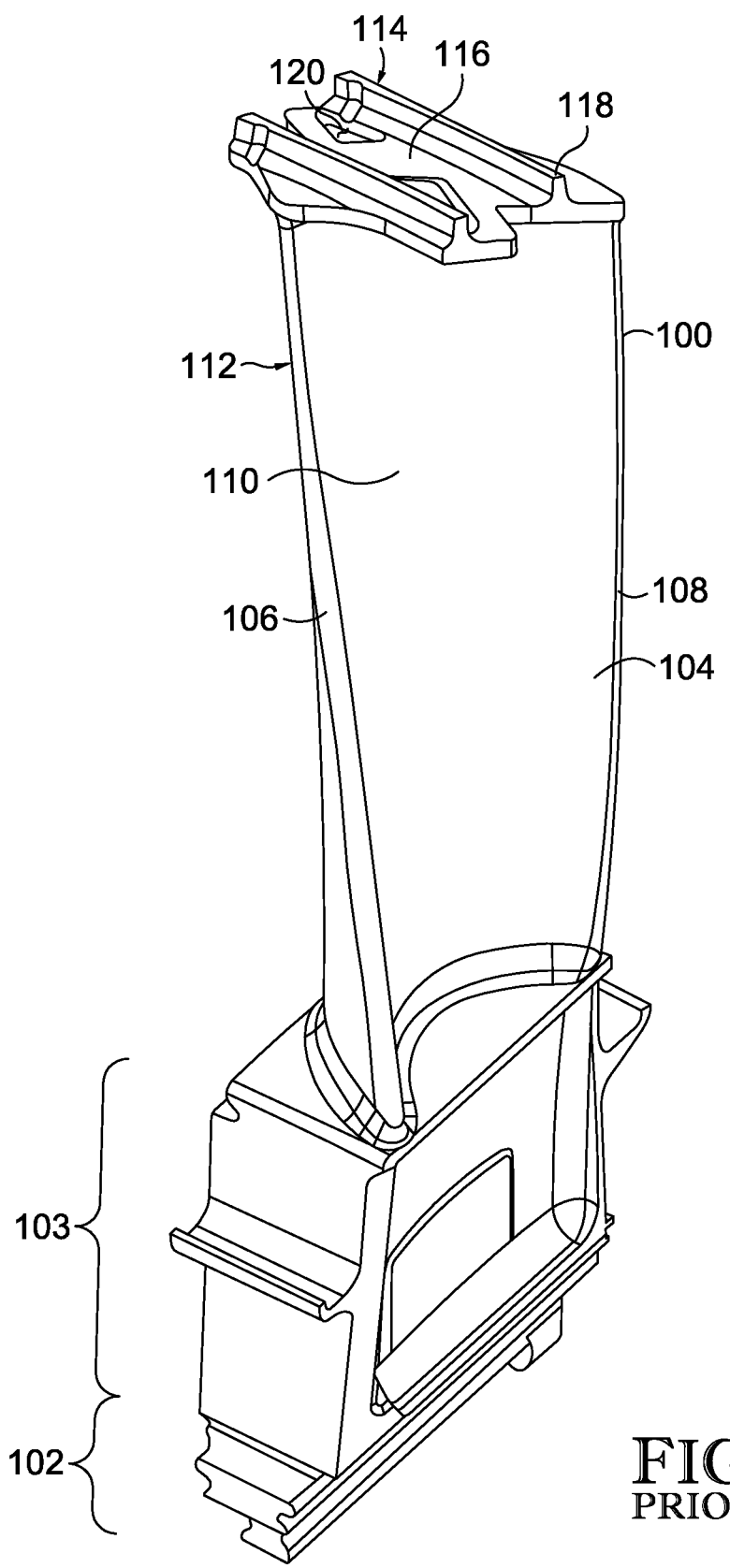
FIG. 1A is a perspective view of a prior art gas turbine airfoil.

Referring now to FIG. 1A, a gas turbine blade 100 is provided. The turbine blade 100 comprises a bottom portion commonly referred to as a root 102, which may be coupled to a rotor disk (not shown). It is understood that the root may be completely integrated into the rotor disk, such that the root does not extend into the flow path. Extending in an upward radial, typically perpendicular to the rotor central axis, direction from the root 102 is the neck 103. The neck 103 may primarily be used as a transitional piece between the root 102 and the gas turbine airfoil 104.

The gas turbine airfoil 104 is comprised of four distinct portions. The first portion of the airfoil 104 that comes first into contact with pressurized gas flow is referred to as the leading edge 106, which is opposed by the last portion of the airfoil to come in contact with the gas flow, defined as the trailing edge 108. The leading edge 106 faces the turbine compressor section (not shown), or turbine inlet, along the rotor center axis. This direction is referred to as the axial direction. When pressurized airflow impedes upon the leading edge 106, the airflow splits into two separate streams of air with different relative pressures. Connecting the leading edge 106 and the trailing edge 108 are two radially extending walls, which are defined based on the relative pressures impeding on the walls. The concave surface seen in FIG. 1A is defined to be a pressure side wall 110. The concave geometry of this surface generates a higher local pressure along the length of the pressure side wall 110. Opposing the pressure side wall 110 is a suction side wall 112. The suction side wall 112 has a convex geometry, which generates a lower local pressure along the length of the suction side wall 112.

The pressure differential created between the pressure side wall 110 and the suction side wall 112 creates an upward lifting force along the cross-section of the gas turbine airfoil 104. The cross-section of the gas turbine airfoil 104 can be seen in greater detail in FIG. 2A. This lifting force actuates the rotational motion of the rotor disk. The rotor disk may be coupled to a compressor and a generator via a shaft (not shown) for the purposes of generating electricity. The uppermost portion of FIG. 1A shows a tip shroud 114 containing a first surface 116 that is populated with knife edges 118 that extend radially outward from the first surface 116. Located between the knife edges 118 are recessed pockets 120.

Figure 1B:
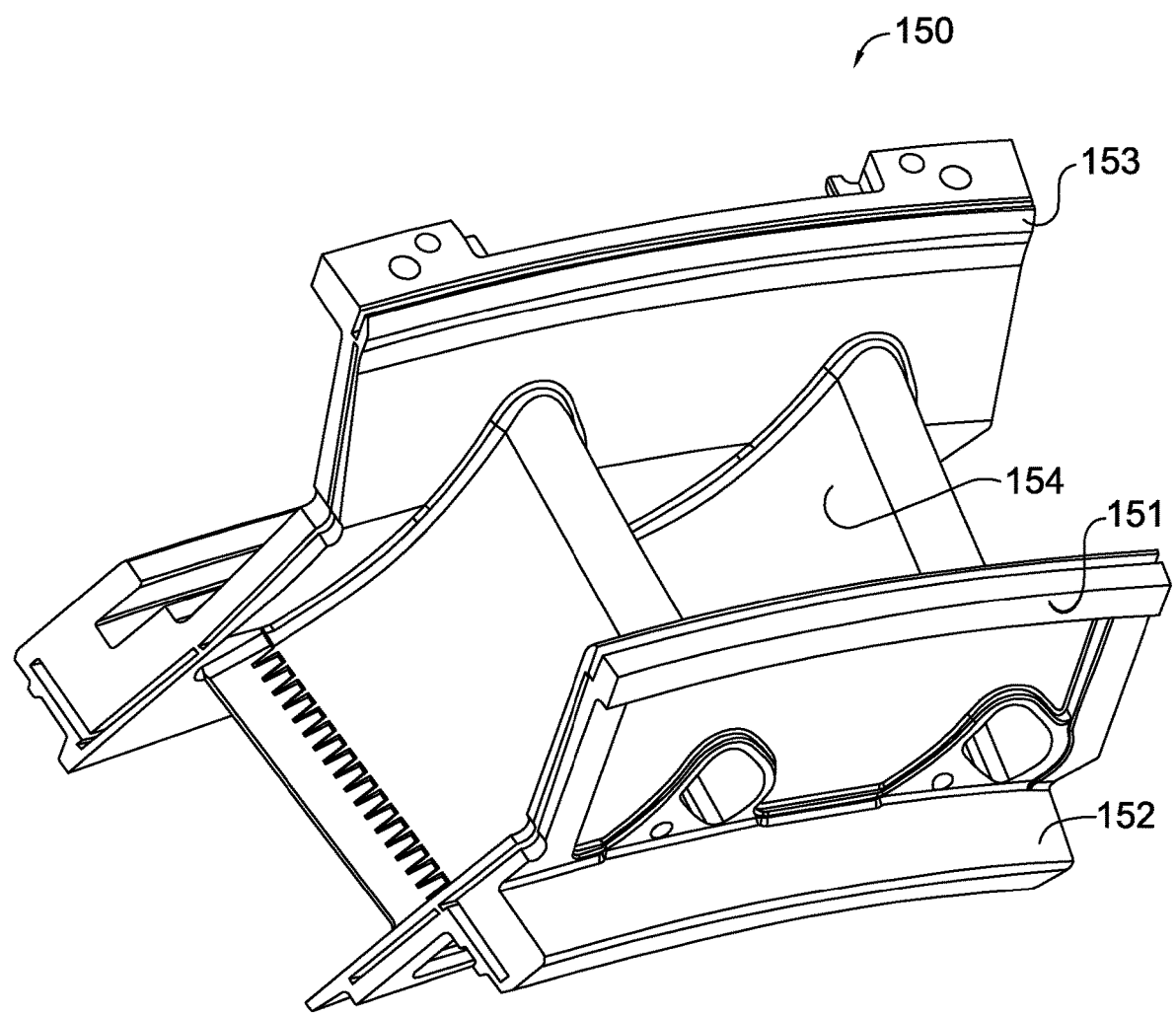
FIG. 1B is a perspective view of a prior art gas turbine vane.

A vane assembly 150 of the prior art is shown in FIG. 1B, and comprises an inner platform 151, inner rail 152, outer platform 153, and vane airfoils 154 extending between inner platform 151 and outer platform 153. While the inner rail 152 serves as a means to seal the rim cavity region from leakage of the cooling air into the hot gas path instead of passing to the designated vanes, inner rail 152 also stiffens inner platform 151. Inner rail 152 may be located proximate the plenum of cooling air and therefore operates at approximately the temperature of the cooling air.

Figure 2A:
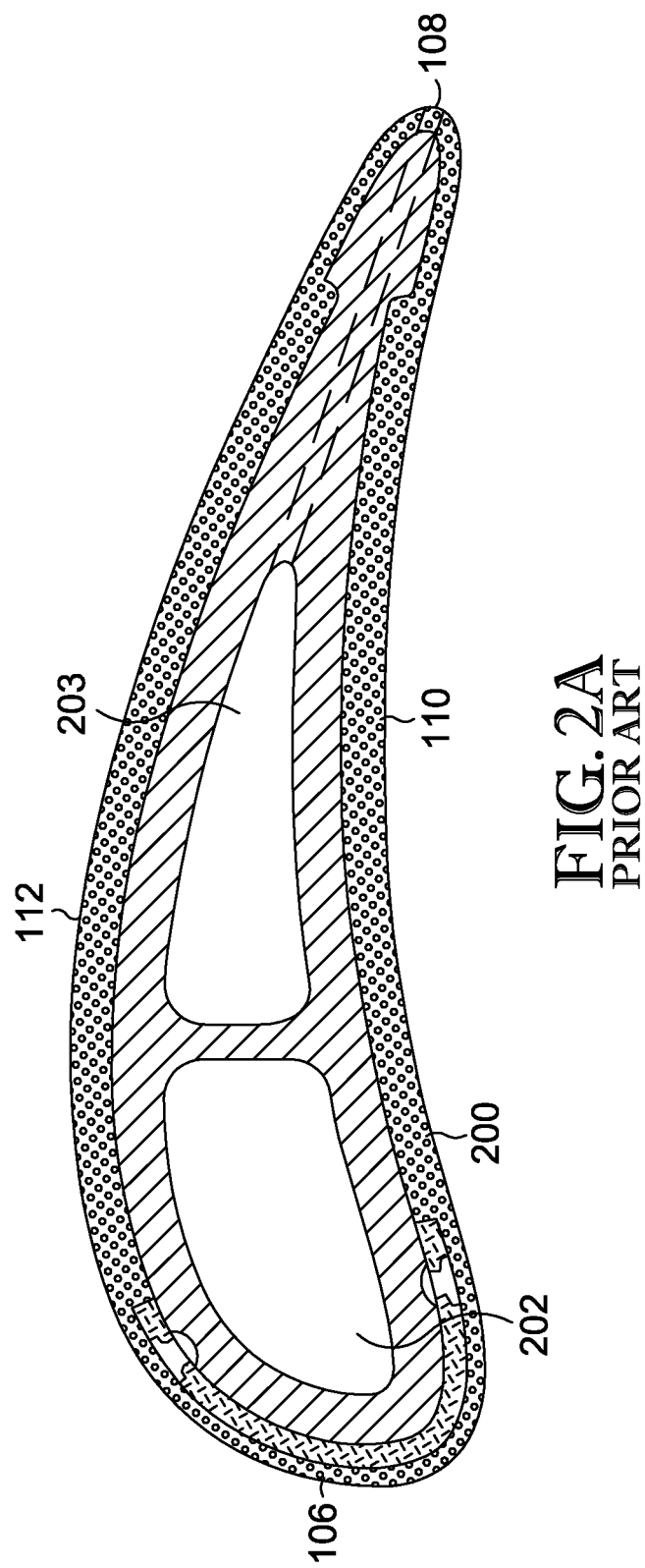
FIG. 2A is a cross-sectional view of the airfoil shown in FIG. 1A or FIG. 1B.

FIG. 2A is a cross-sectional view of a prior art cooling design for a gas turbine airfoil 200 viewed along line 2-2 in FIG. 1A, which may be implemented in a blade airfoil such as the airfoil 104 shown FIG. 1A or a vane airfoil such as the vane airfoil 154 shown in FIG. 1B. FIG. 2A is cross-sectional for the purposes of showing cooling passages 202 and 203. Gas turbine airfoils 200 may operate in an environment where temperatures exceed the melting point of the materials used to construct the airfoil. Therefore, cooling passages 202 and 203 are provided as a way to decrease the temperature of the airfoil 200 during operation by flowing cooling air through the cooling passages of the airfoil 200.

Figure 2B:
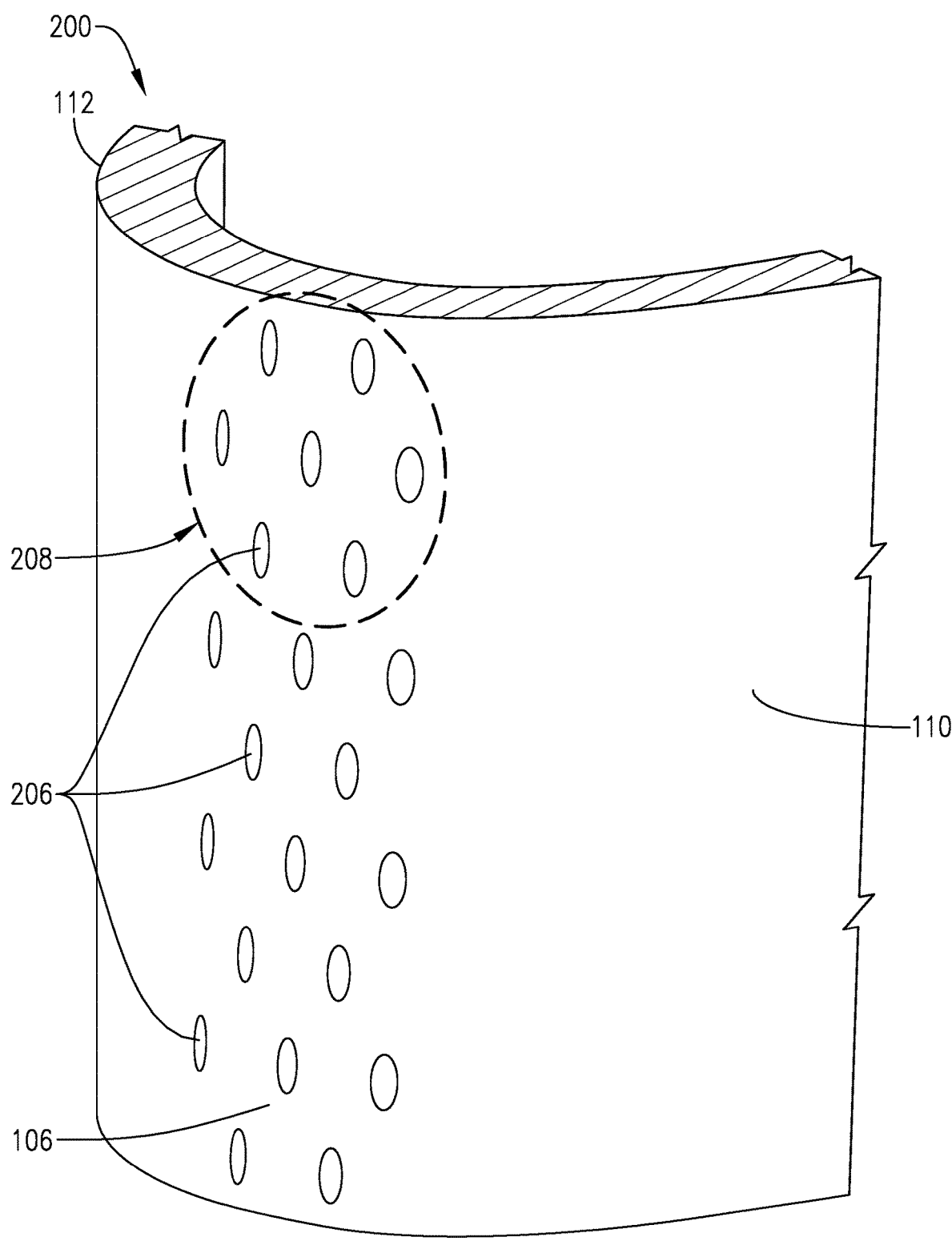
FIG. 2B is a perspective view of a portion of the airfoil shown in FIG. 2A.

FIG. 2B is an angled, partial perspective view of the gas turbine airfoil 200 shown in FIG. 2A. The gas turbine airfoil 200 has a plurality of cooling holes 206 disposed at the leading edge 106 of the airfoil. The cooling holes 106—known to those skilled in the art as "showerhead" holes because their arrangement resembles the openings on a showerhead (as illustrated by the seven cooling holes 206 encompassed by circle 208)—are tubular or cylindrical through-holes formed at the leading edge 106 of the airfoil 200 and are in fluid communication with an internal cooling passage such as cooling passage 202 shown in FIG. 2A. The through-holes 206 are typically drilled at an oblique angle with respect to the radial direction.

During use, cooling fluid from inside the airfoil 200 (such as cooling air in cooling passage 202) exits through the cooling holes 206. The cooling fluid cools the leading edge 106 of the airfoil 200 as it passes therethrough due to convection heat transfer, and then forms a thin film of cooling air over the outer surface of the airfoil 200 when it exits the airfoil 200 at the leading edge 106. The film of cooling air provides additional heat transfer while also forming a protective layer on the outer surface of the airfoil 200 to provide additional protection against the hot combustion gasses flowing over the outer surface of the airfoil 200.

In such embodiments, the cooling air must be discharged at a relatively high pressure and/or velocity in order to avoid hot gas ingestion into the cooling holes 206. More particularly, because the cooling holes 206 are located on the leading edge 106 of the airfoil 200 where the hot combustion gasses meet the airfoil 200, if the relative pressure and/or velocity of the cooling air is too low, the hot combustion gasses will overwhelm the cooling air and thus enter the cooling holes 206 and ultimately the cooling passage 202 inside of the airfoil. This in turn leads to increased temperatures within the leading edge 106 of the airfoil 200 and potentially premature failure of the part.

Moreover, because the cooling holes 206 are throughholes drilled straight through the leading edge 106 of the airfoil 200, the cooling holes 206 have a relatively short axial length. The cooling holes 206 thus provide relatively limited heat extraction attributable to hole length. Instead, airfoil designs employing the showerhead design 208 rely mostly on the cooling film effect provided around the turbine 200 to cool the turbine and protect it from the hot combustion gasses passing over the exterior. But in some instances, this film cooling effect can create turbulent flow along the exterior of the airfoil 200, which in turn increases the heat load to the airfoil 200. Thus, the showerhead design 208 of cooling hole 206 can be ineffective for certain applications.

Traditionally, air cooled turbine airfoils, such as those shown in FIGS. 1A-2B, are produced by a machining process or an investment casting process by forming a wax body of the turbine airfoil, providing an outer shell about the wax part, and then melting the wax to leave a mold for the liquid metal. Then, liquid metal is poured into the mold to fill the void left by the wax. Often, the wax also contains a ceramic core to establish large cooling channels within the metal turbine airfoils. Once the liquid metal cools and solidifies, the shell is removed and the ceramic core is chemically leached out of the now solid metal turbine airfoil, resulting in a hollow turbine airfoil. These traditional casting methods have limits as to the geometry that can be cast. Internal geometrical shapes, as well as small geometrical intricacies, are generally not suitable for die casting.

New developments in additive manufacturing have occurred which can expand the capabilities beyond traditional investment casting techniques. Namely, additive manufacturing can be used to create intricacies that were previously unattainable. The embodiments of the present invention may be created using such an additive manufacturing process. An example of an additive manufacturing process is selective laser melting, known more commonly in the manufacturing field as SLM. Although SLM is widely considered a common additive manufacturing process, the embodiments described herein can be manufactured with any additive manufacturing process, such as selective laser sintering (SLS), direct metal laser sintering (DMLS), laser powder bed fusion (LPBF), or direct energy deposition (DED) or an alternative additive manufacturing method. The SLM processes described herein are intended to be non-limiting and exemplary.

FIGS. 3-7 are various views of an exemplary gas turbine airfoil 300 incorporating near leading edge cooling channels 320, 322 according to an embodiment of the present invention. The cooling channels 320, 322 are provided at or near the leading edge 306 of the turbine airfoil 300, and more particularly near a stagnation point 324 of the airfoil 300. The placement and configuration of the cooling channels 320, 322 provide enhanced heat transfer benefits while reducing the likelihood of hot combustion gas ingestion and turbulent combustion gas flow, as discussed in connection with the prior art airfoil 200 having known showerhead design 208 of cooling holes 206.

Figure 3:
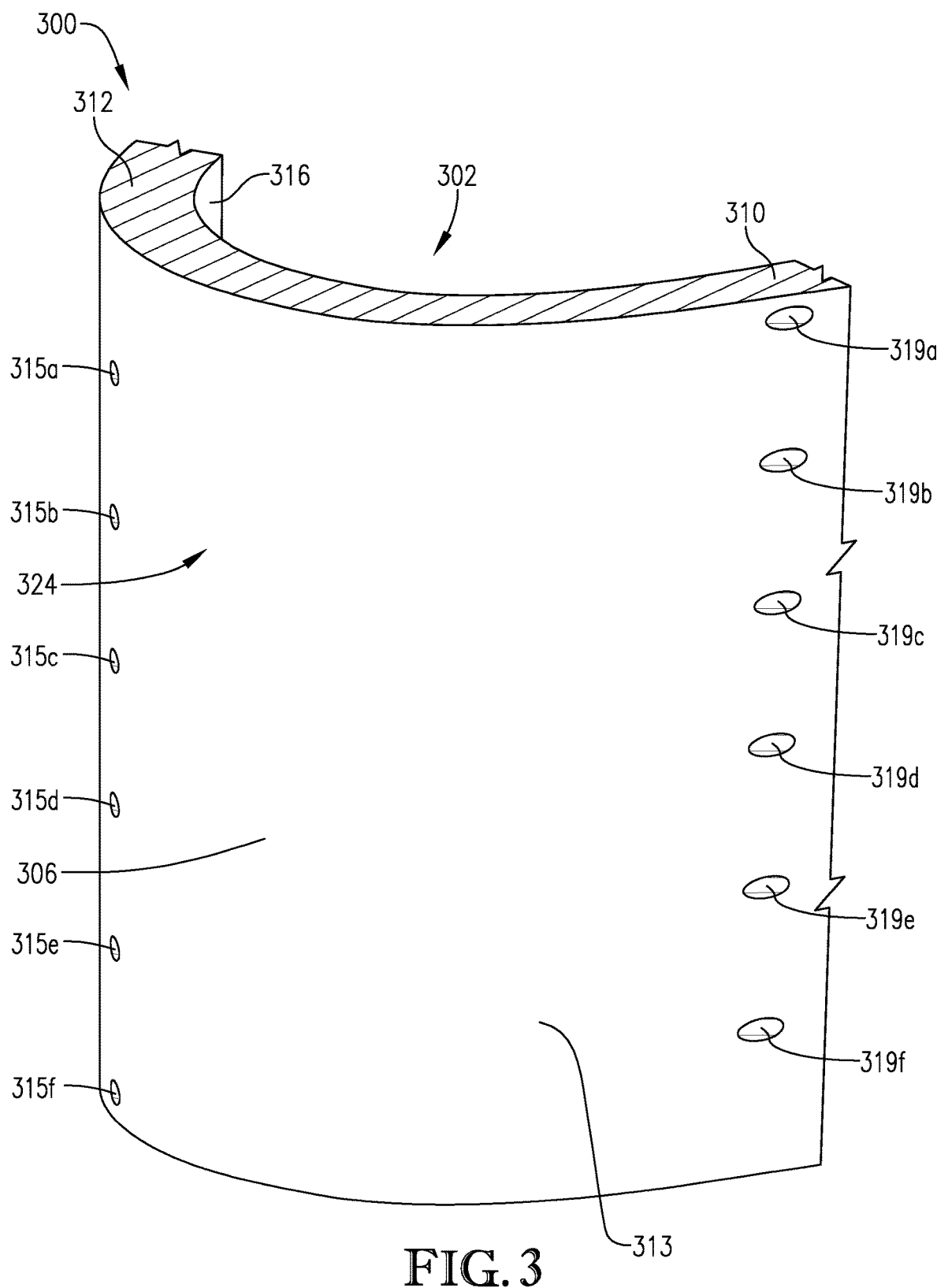
FIG. 3 is a partial perspective view of an airfoil having multiple cooling channels, in accordance with an embodiment of the present invention.
Figure 4:
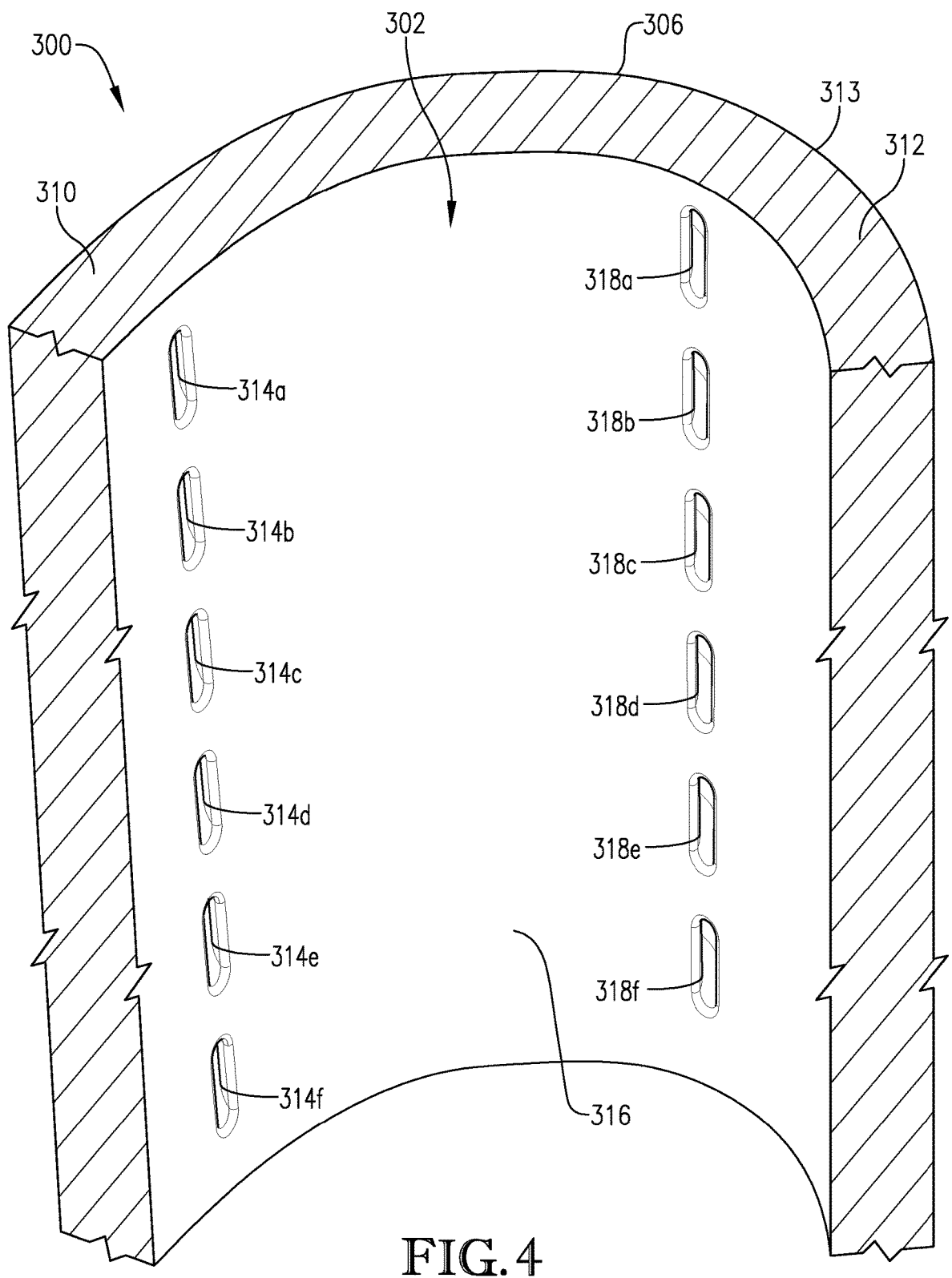
FIG. 4 is another partial perspective view of the airfoil shown in FIG. 3.
Figure 5:
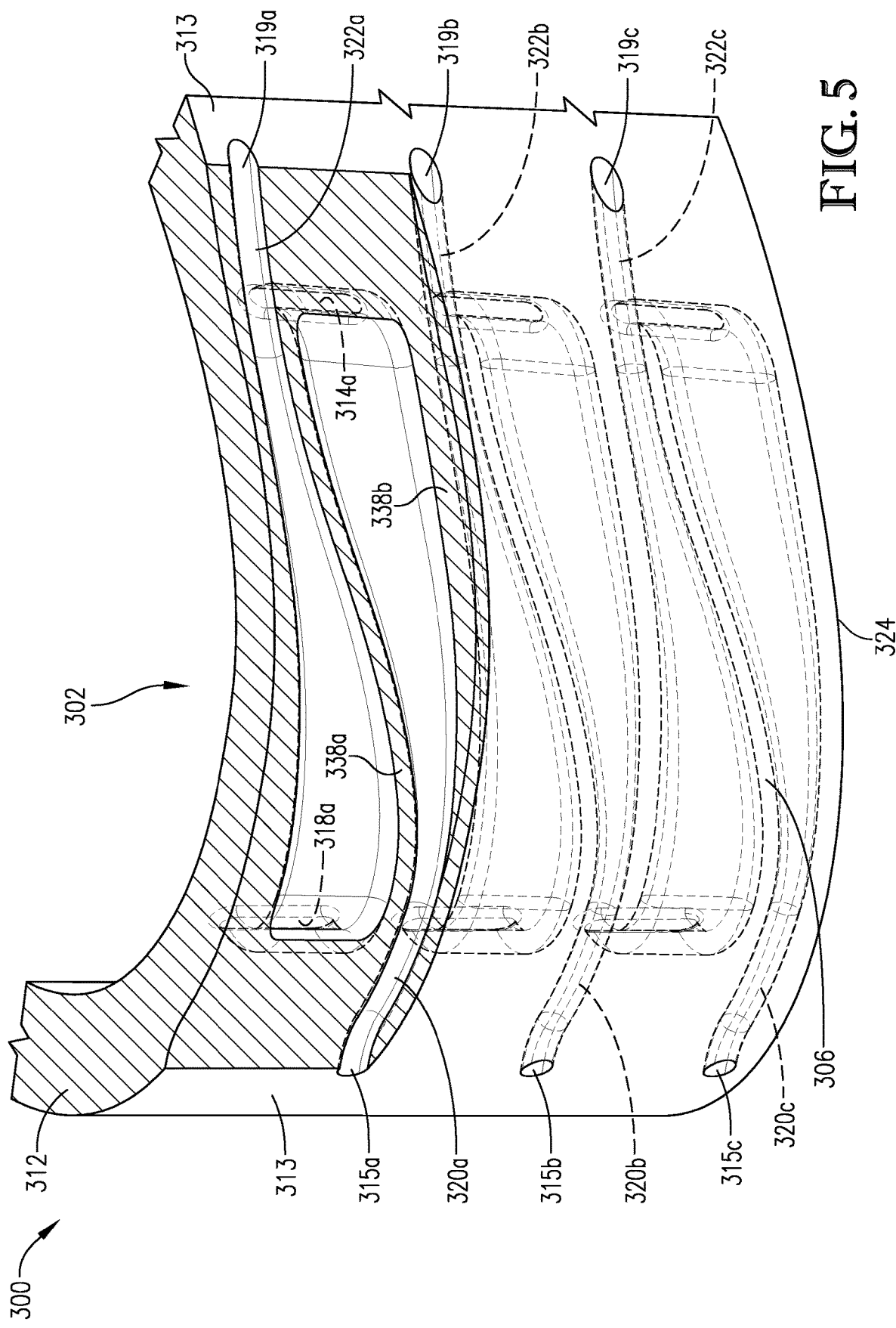
FIG. 5 is a partial cross-sectional, elevation view of the airfoil shown in FIGS. 3-4.

FIG. 3 shows a portion of the gas turbine airfoil 300 near its leading edge 306. Although the views shown in FIGS. 3-7 depict only the portion near the leading edge 306 in order to more clearly illustrate the various channels and openings, it should be appreciated that the airfoil 300 extends from a leading edge 306 to a trailing edge (not shown) in a similar manner as the airfoils depicted in FIGS. 1A-2B.

The airfoil 300 has a pressure side wall 310 extending from the leading edge stagnation point 324 (i.e, a point where the local velocity of the fluid flow along the outer surface of the airfoil 300 is zero) to a trailing edge of the airfoil 300, and a suction side wall 312 opposite the pressure side wall 310 and extending from the leading edge stagnation point 324 to a trailing edge of the airfoil 300. The outer surfaces of the pressure side wall 310 and suction side wall 312 collectively form an outer surface 313 of the airfoil 300, while the inner surfaces of the pressure side wall 310 and suction side wall 312 collectively form an inner surface 316 of the airfoil 300. The inner surface 316 of the airfoil 300 partially defines a cooling passage 302 within the airfoil 300. During operation, and as will be discussed in more detail below, cooling fluid (such as compressed air) is provided to the cooling passage 302, which in turn exits the airfoil 300 via the cooling channels 320, 322. The cooling fluid's serpentine path through the cooling channels 320, 322 allows for efficient heat extraction of heat generated in the leading edge 306 of the airfoil via the hot combustion gasses passing over it to transfer to the cooling fluid.

Each cooling channel 320, 322 generally extends from an inlet on the inner surface 316 to an outlet on the outer surface 313. For the first cooling channel 320, the inlet is provided at a first opening 314 located in the pressure side wall 310—i.e., on a pressure side of the leading edge stagnation point 324—and the outlet is provided at a second opening 315 provided in the suction side wall 312—i.e., on a suction side of the leading edge stagnation point 324. For the second cooling channel 322, the inlet is provided at the third opening 318 located in the suction side wall 312—i.e., on a suction side of the leading edge stagnation point 324—and the outlet is provided at the fourth opening 319 located in the pressure side wall 310—i.e., on a pressure side of the leading edge stagnation point 324. In this regard, for each channel 320, 322, the only inlet is provided on one of the pressure side of the stagnation point 324 and on the suction side of the stagnation point, and the only outlet is provided on the other of the pressure side of the stagnation point 324 and the suction side of the stagnation point 324. More particularly, cooling fluid passing through first cooling channel 320 enters the channel 320 only in the pressure side wall 310 and exits the channel only in the suction side wall 312. And cooling fluid passing through the second cooling channel 322 enters the channel 322 only in the suction side wall 312 and exits the channel only in the pressure side wall 310. Thus, the near wall leading edge cooling channels 320, 322 are fed internally from two distinct locations—one on the pressure side wall 310 and one on the suction side wall 312—and in turn exit the turbine 300 also at two distinct locations—one on the pressure side wall 310 and one on the suction side wall 312.

Figure 7:
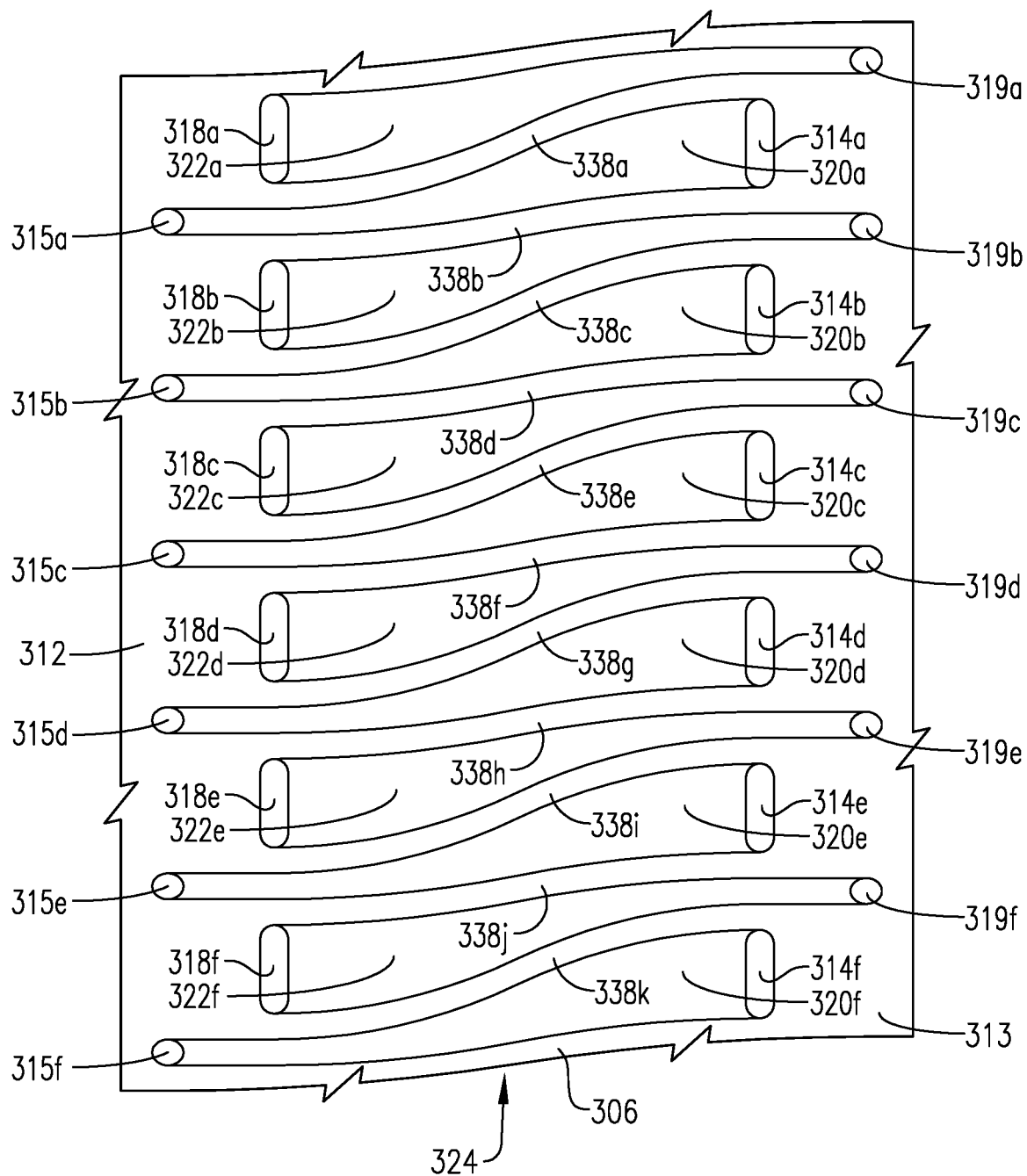
FIG. 7 is a schematic depiction of the cooling channels incorporated into a leading edge of the airfoil shown in FIGS. 3-6.

The cooling channels 320, 322 serpentinite through the leading edge 306 of the airfoil 300 such that they are not in fluid communication with the other channels 320, 322 provided therein. More particularly, each channel 320 is radially aligned with but spaced apart from another channel 320, while each channel 322 is radially aligned with but spaced apart from another channel 322. Between each pair of adjacent, first cooling channels 320 in the radial direction is a portion of an intervening second cooling channel 322, and similarly between each pair of adjacent, second channels 322 in the radial direction is a portion of an intervening first cooling channel 320. This creates a stacked configuration of discrete, alternating pressure-side extending channels 320a-320f and suction-side extending channels 322a-322f as best seen in FIG. 7. More particularly, the channels are arranged in a staggered configuration such that a second cooling channel 322 is provided between, in the radial direction, adjacent first cooling channels 320, and similarly such that a first cooling channel 320 is provided between, in the radial direction, adjacent second cooling channels 322.

The cooling channels 320, 322 are completely independent of adjacent channels, such that there is no fluid communication or other connection between each adjacent, stacked channel as best seen in FIG. 7. More particularly, a solid portion of the airfoil wall 338 separates each adjacent channel 320, 322. This, in turn, leads to alternating directions of cooling fluid flow in each adjacent channel 320, 322. For example, and turning to FIG. 7, for each of the first cooling channels 320a-f, cooling fluid will generally flow to the left-hand side of the airfoil 300 as it is viewed in FIG. 7, while for each of the second cooling channels 322a-f, cooling fluid will generally flow to the right-hand side of the airfoil 300 as it is viewed in FIG. 7.

Figure 6:
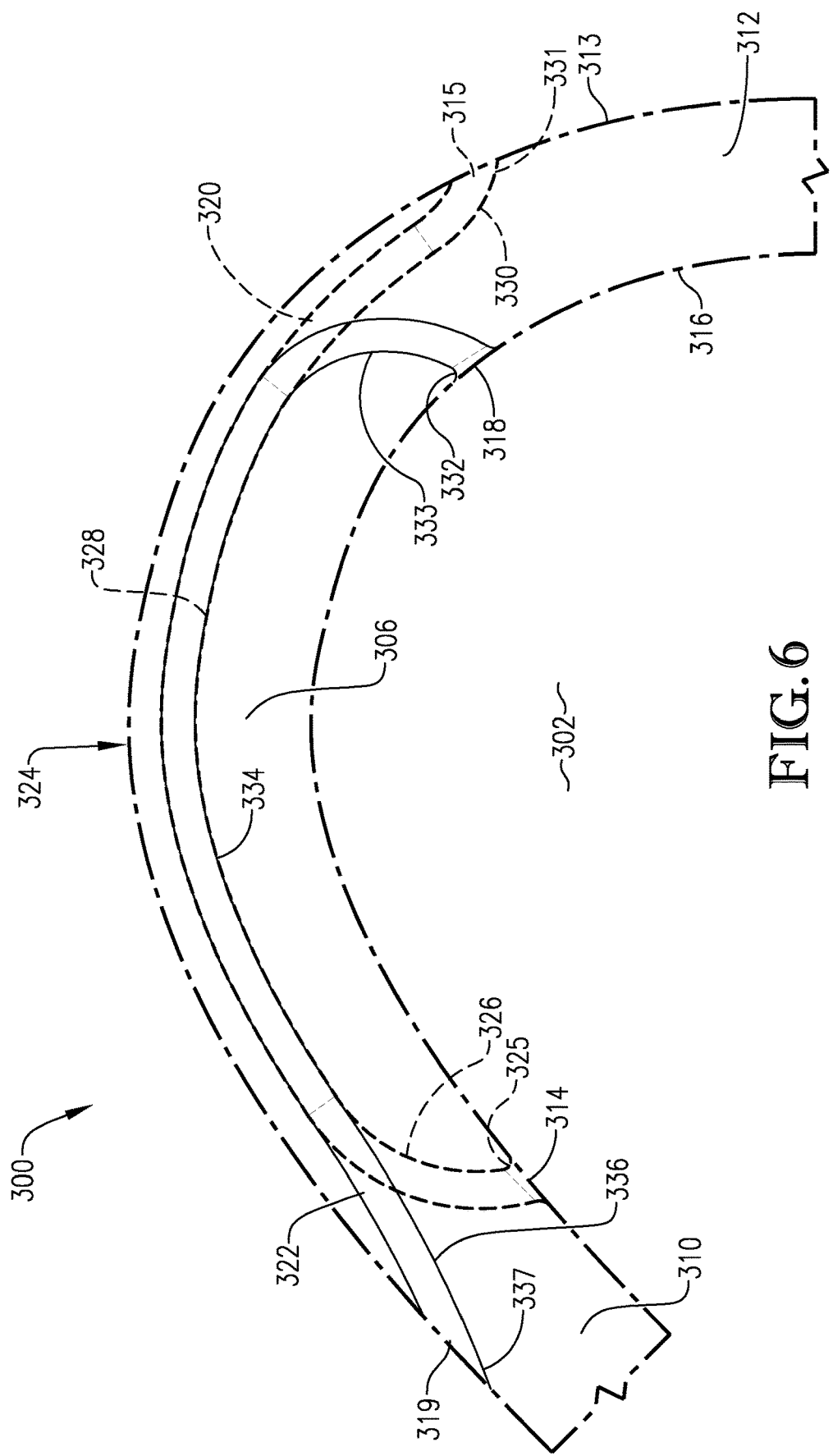
FIG. 6 is a partial plan view of the airfoil shown in FIGS. 3-5.

As best seen in FIG. 6, each channel generally includes an inlet transition portion 325, 332, an axially extending portion 326, 333, a circumferentially extending second portion 328, 334, an outwardly turning portion 330, 336, and an outlet transition portion 331, 337. More particularly, the first cooling channel 320 includes an inlet transition portion 325 extending from the first opening 314 to an axially extending portion 326, which in turn transitions to a circumferentially extending portion 328, which in turn transitions to an outwardly turning portion 330, and finally an outlet transition portion 331 extends from the outwardly turning portion 330 to the second opening 315. Similarly, the second cooling channel 322 includes an inlet transition portion 332 extending from the third opening 318 to an axially extending portion 333, which in turn transitions to a circumferentially extending portion 334, which in turn extends to an outwardly turning portion 336, and finally an outlet transition portion 337 extending from the outwardly turning portion 336 to the fourth opening 319.

The cooling channels 320, 322 taper—i.e., the cross-sectional area of the cooling channels 320, 322 continually decrease—along most or all of their length in the downstream direction such that the cooling fluid passing therethrough accelerates and ultimately exits the outlets (i.e., second and fourth openings 315, 319) at a higher velocity than a velocity at which the fluid entered the inlets (i.e., first and third openings 314, 318). As used herein, "downstream" refers to a direction of cooling fluid travel through the respective channel, generally from an interior of the airfoil 300 to the exterior of the airfoil 300.

For example, in one embodiment the cross-sectional areas of the cooling channels 320, 322 continually decrease along their respective downstream lengths such that the largest cross-sectional area of the channels 320, 322 are provided at an inlet thereto (first and third openings 314, 318, respectively) and a smallest cross-sectional area of the channels 320, 322 are provided at an outlet thereto (second and fourth openings, 315, 319, respectively). In other embodiments, the cross-sectional areas of the cooling channels 320, 322 continually decrease along substantially the entire downstream lengths, such as, e.g., all but for the outlet transition portions 331, 337, in which the cross-sectional area of the cooling channels 320, 322 increases slightly just before the second and fourth openings 315, 319, respectively. In such embodiments, the outlet transition portions 331, 337 have a flared or bell-mouth shape, which provides a slight increase in cross-sectional area proximate the outlets of the respective channels 320, 322. As should be appreciated, a "bell-mouth" shape refers to a tapered expanding or reducing opening resembling the shape of a bell. Notwithstanding this slight increase, in such embodiments the cross-sectional area of the second and fourth openings 315, 319 will be smaller than the first and third openings 318, 319, respectively.

During operation, the cooling fluid enters the channels 320, 322 in a direction normal to the airfoil inner surface 316 through a flared or bell-mouth shaped inlet 325, 332 for minimum pressure loss. As best seen in FIG. 6, cooling fluid entering the first opening 314 enters the bell-mouth shaped inlet transition portion 325, while cooling fluid entering the third opening 318 enters the bell-mouth shaped inlet transition portion 332. The cooling fluid progressively accelerates as it moves through the channels 320, 322 due to the tapering cross-sectional area of the channels 320, 322. The flow of the cooling fluid is first directed towards the stagnation point 324 via the axially extending portions 326, 333. The flow is then turned and travels within circumferentially extending portions 328, 334 such that the cooling fluid runs parallel and near to the outer surface 313 proximate to the stagnation point 324. The cooling fluid then turns slightly towards to the outer surface 313 via the outwardly turning portions 330, 336. The cooling fluid then exits the airfoil 300 wall via the optionally flared outlet transition portions 331, 337 and second and fourth openings 315, 319, respectively. Again, in some embodiments, the outlet transition portions 331, 337 are bell-mouth shaped such that the cross-sectional area of the cooling channels 320, 322 increase slightly at the outlets thereof. In all, cooling fluid that entered the first cooling channel 320 at the first opening 314 on the pressure side wall 310 ultimately exits the channel 320 on the suction side wall 312, and, conversely, cooling fluid that entered the second cooling channel 322 at the third opening 318 on the suction side wall 312 ultimately exits the channel 322 on the pressure side wall 310.

The amount of cooling fluid that the flows through each channel 320, 322 is dependent on the cross-sectional area of the first and third openings 314, 318, the amount of tapering of the cross-sectional area of the channels 320, 322 along the channels' respective downstream lengths, and the exit location of the channels 320, 322 at second and fourth openings 315, 319. The exit location (i.e., the location of the second and fourth openings 315, 314) is selected to ensure a safe static pressure is achieved from the flow of hot combustion gasses around the airfoil 300, which in turn reduces the risk of hot gas ingestion and increased turbulence, as discussed.

The unique arrangement and configuration of the cooling channels 320, 322 in the leading edge 306 of the gas turbine airfoil 300 provides enhanced cooling performance over known cooling channels, such as the showerhead design 208 of cooling channels 206 shown in FIG. 2B. The serpentine flow of the cooling fluid within the leading edge 306 that is caused by the cooling fluid exiting on an opposite side of the airfoil from which it enters (i.e., cooling fluid entering on the pressure side wall 310 via first opening 314 exits on the suction side wall 312 via second opening 315, while cooling fluid entering on the suction side wall 312 via third opening 318 exits on the pressure side wall 310 via fourth opening 319) provides for increased length of the cooling channels 320, 322 compared to known cooling channels, thus allowing for greater heat extraction as the cooling fluid passes through the leading edge 306. Moreover, by staggering the cooling channels 320a-320f with the cooling channels 322a-322f (i.e., configuring the channels 320, 322 such they alternate in the vertical direction without any connection between adjacent channels 320, 322), the cooling fluid flows in multiple directions throughout the leading edge, further enhancing heat extraction. This cross-flowing arrangement of the cooling fluid in the leading edge 306 improves overall heat pickup and thus requires much less cooling fluid for the same target metal temperature. The cross-flowing arrangement of the cooling fluid also leads to a more uniform temperature distribution within the leading edge 306 as compared to known designs such as the showerhead configuration 208 of cooling holes 206 shown in FIG. 2B.

As discussed, the cooling channels 320, 322 taper along their downstream length, which in turn accelerates the cooling fluid flowing therein and increases the heat transfer properties of the cooling fluid. Moreover, the outlets of the channels 320, 322—second and fourth openings 315, 319—are located further away from the stagnation point 324 than known cooling channels. More particularly, the outlets of the channels 320, 322 are provided at a portion of the airfoil 300 having a safe static pressure from the main flow of compressed air and/or combustion gasses around the airfoil 300. This reduces the threat of hot gas ingestion into the cooling channels 320, 322 even when the cooling fluid is provided at a relatively low pressure and/or velocity. Moreover, the pressure differential (i.e., the difference in pressure between the inlets and outlets of the channels 320, 322) available to drive the cooling fluid flowing through leading edge cooling channels is at its minimum for channels having an outlet near the stagnation point 324. By moving the second and fourth openings 315, 319 away from the stagnation point 324, the cooling channels 320, 322 have an increased pressure ratio available to efficiently move cooling fluid therethrough.

In all, the unique alternating, serpentine configuration of the cooling channels 320, 322 allows for more efficient cooling, thus requiring less cooling fluid and/or a reduced mass flow rate in order to achieve the cooling effect of known designs such as the showerhead configuration 208 of cooling holes 206 shown in FIG. 2B. For example, for a given mass flow rate, cooling fluid provided through the channels 320, 322 will achieve drastically reduced temperatures in the airfoil 300 as compared to cooling fluid provided through the showerhead design 208 of cooling holes 206 of FIG. 2B. Alternatively, to achieve the same average metal temperature of the airfoil, cooling fluid provided through the channels 320, 322 can be provided at a significantly reduced mass flow rate as compared to cooling fluid provided through the showerhead design 208 of cooling channels of FIG. 2B. For example, in some embodiments, the use of the serpentine, alternating cooling channels 320, 322 of the instant disclosure results in more than half cooling fluid flow reduction to achieve the same average metal temperature as is achieved using the showerhead design 208 of cooling holes 206.

Moreover, although the complex design of the airfoil 300, including the internal serpentine, alternating cooling channels 320, 322, would be nearly impossible to create such using traditional manufacturing processes such as investment casting or the like discussed above, in some embodiments the airfoil 300 and its internal channels 320, 322 are created using an additive manufacturing process. In such a process, the airfoil 300 is built up layer by layer, leaving voids in the sidewalls at appropriate locations in order to produce the serpentine, tapering, alternating cooling channels 320, 322. Thus, the airfoil 300 including the complex cooling channels 320, 322 can be efficiently manufactured and implemented in gas turbine engines. The use of an additive manufacturing process to create the turbine 300 with the serpentine, tapering, alternating cooling channels 320, 322 results in minimum local stress as compared to known designs with variable wall sections yielding high thermal gradients during build.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense. Additional objects, advantages, and novel features of the invention will be set forth in part in the description which follows, and in part will become apparent to those skilled in the art upon examination of the following or may be learned by practice of the invention.

What is claimed is:

1. An airfoil for a gas turbine having a leading edge and a trailing edge, the airfoil comprising:
   an airfoil wall having a pressure side and a suction side, the pressure side including a pressure side inner surface and a pressure side outer surface, the suction side including a suction side inner surface and a suction side outer surface, the pressure side inner surface and the suction side inner surface together defining an inner surface of the airfoil wall, and the pressure side outer surface and the suction side outer surface together defining an outer surface of the airfoil wall, wherein the inner surface of the airfoil wall at least partially defines an airfoil chamber at least partially enclosed within the airfoil wall;
   a plurality of first cooling channels proximate the leading edge of the airfoil, each of the plurality of first cooling channels including an inlet at a first opening provided on the pressure side inner surface and an outlet at a second opening provided on the suction side outer surface; and
   a plurality of second cooling channels proximate the leading edge of the airfoil, each of the plurality of second cooling channels including an inlet at a third opening provided on the suction side inner surface and an outlet at a fourth opening provided on the pressure side outer surface, wherein the plurality of first cooling channels and the plurality of second cooling channels provide fluid communication between the airfoil chamber and an exterior of the airfoil wall, wherein each of the plurality of first cooling channels includes a first inlet transition portion, a first axially extending portion, a first circumferentially extending portion, a first outwardly turning portion, and a first outlet transition portion, and wherein each of the plurality of second cooling channels includes a second inlet transition portion, a second axially extending portion, a second circumferentially extending portion, a second outwardly turning portion, and a second outlet transition portion.

2. The airfoil of claim 1, wherein the plurality of first cooling channels includes an upper first cooling channel and a lower first cooling channel, wherein the plurality of second cooling channels includes an upper second cooling channel and a lower second cooling channel, and wherein the plurality of first cooling channels and the plurality of second cooling channels are arranged in a staggered configuration such that the upper second cooling channel is located between, in a radial direction of the airfoil, the upper first cooling channel and the lower first cooling channel, and such that the lower first cooling channel is located between, in the radial direction of the airfoil, the upper second cooling channel and the lower second cooling channel.

3. The airfoil of claim 1, wherein for each of the plurality of first cooling channels, a first cross-sectional area of the first opening is greater than a second cross-sectional area of the second opening, and wherein for each of the plurality of second cooling channels, a third cross-sectional area of the third opening is greater than a fourth cross-sectional area of the fourth opening.

4. The airfoil of claim 3, wherein each of the plurality of first cooling channels and the plurality of second cooling channels continually tapers along its respective entire downstream length.

5. The airfoil of claim 3, wherein each of the plurality of first cooling channels includes a first flared outlet transition portion proximate the second opening, wherein each of the plurality of second cooling channels includes a second flared outlet transition portion proximate the fourth opening, wherein each of the plurality of first cooling channels continually tapers from the first opening to an inlet of the first flared outlet transition portion, and wherein each of the plurality of second cooling channels continually tapers from the third opening to an inlet of the second flared outlet transition portion.

6. The airfoil of claim 1, wherein the first circumferentially extending portion and the second circumferentially extending portion extend parallel to the outer surface of the airfoil wall.

7. The airfoil of claim 6, wherein the first circumferentially extending portion and the second circumferentially extending portion are located proximate a stagnation point of the airfoil.

8. The airfoil of claim 1, wherein the first inlet transition portion and the second inlet transition portion comprise a bell-mouth shape.

9. The airfoil of claim 1, wherein the plurality of first cooling channels and the plurality of second cooling channels are formed using additive manufacturing.

10. A gas turbine assembly, the assembly comprising:
a plurality of airfoils, wherein each of the plurality of airfoils comprises:

an airfoil wall having a pressure side and a suction side, the pressure side including a pressure side inner surface and a pressure side outer surface, the suction side including a suction side inner surface and a suction side outer surface, the pressure side inner surface and the suction side inner surface together defining an inner surface of the airfoil wall, and the pressure side outer surface and the suction side outer surface together defining an outer surface of the airfoil wall, wherein the inner surface of the airfoil wall at least partially defines an airfoil chamber at least partially enclosed within the airfoil wall;

a plurality of first cooling channels proximate the leading edge of the airfoil, each of the plurality of first cooling channels including an inlet at a first opening provided on the pressure side inner surface and an outlet at a second opening provided on the suction side outer surface; and a plurality of second cooling channels proximate the leading edge of the airfoil, each of the plurality of second cooling channels including an inlet at a third opening provided on the suction side inner surface and an outlet at a fourth opening provided on the pressure side outer surface, wherein the plurality of first cooling channels and the plurality of second cooling channels provide fluid communication between the airfoil chamber and an exterior of the airfoil wall, wherein each of the plurality of first cooling channels and each of the plurality of second cooling channels includes a circumferentially extending portion extending a majority of a length of the corresponding cooling channel, and wherein each circumferentially extending portion extends parallel to the outer surface of the airfoil wall and is located proximate a stagnation point of the airfoil.

11. The gas turbine assembly of claim 10, wherein, for each of the plurality of airfoils:
the plurality of first cooling channels includes an upper first cooling channel and a lower first cooling channel,
the plurality of second cooling channels includes an upper second cooling channel and a lower second cooling channel, and
the plurality of first cooling channels and the plurality of second cooling channels are arranged in a staggered configuration such that the upper second cooling channel is located between, in a radial direction of the airfoil, the upper first cooling channel and the lower first cooling channel, and such that the lower first cooling channel is located between, in the radial direction of the airfoil, the upper second cooling channel and the lower second cooling channel.

12. The gas turbine assembly of claim 10, wherein, for each of the plurality of airfoils, each of the plurality of first cooling channels and the plurality of second cooling channels continually tapers along its respective entire downstream length.

13. The gas turbine assembly of claim 10, wherein, for each of the plurality of airfoils:
each of the plurality of first cooling channels includes a first flared outlet transition portion proximate the second opening,
each of the plurality of second cooling channels includes a second flared outlet transition portion proximate the fourth opening, each of the plurality of first cooling channels continually tapers from the first opening to an inlet of the first flared outlet transition portion, and each of the plurality of second cooling channels continually tapers from the third opening to an inlet of the second flared outlet transition portion.

14. The gas turbine assembly of claim 10, wherein, for each of the plurality of airfoils:

each of the plurality of first cooling channels includes a first inlet transition portion, a first axially extending portion, a first outwardly turning portion, and a first outlet transition portion, and each of the plurality of second cooling channels includes a second inlet transition portion, a second outwardly turning portion, and a second outlet transition portion.

15. A method of manufacturing airfoils, the method comprising:

forming, using additive manufacturing:

an airfoil wall having a pressure side and a suction side, the pressure side including a pressure side inner surface and a pressure side outer surface, the suction side including a suction side inner surface and a suction side outer surface, the pressure side inner surface and the suction side inner surface together defining an inner surface of the airfoil wall, and the pressure side outer surface and the suction side outer surface together defining an outer surface of the airfoil wall, wherein the inner surface of the airfoil wall at least partially defines an airfoil chamber at least partially enclosed within the airfoil wall;

a plurality of first cooling channels proximate the leading edge of the airfoil, each of the plurality of first cooling channels including an inlet at a first opening provided on the pressure side inner surface and an outlet at a second opening provided on the suction side outer surface; and a plurality of second cooling channels proximate the leading edge of the airfoil, each of the plurality of second cooling channels including an inlet at a third opening provided on the suction side inner surface and an outlet at a fourth opening provided on the pressure side outer surface, wherein the plurality of first cooling channels and the plurality of second cooling channels provide fluid communication between the airfoil chamber and an exterior of the airfoil wall, wherein each of the plurality of first cooling channels and each of the plurality of second cooling channels includes a circumferentially extending portion extending a majority of a length of the corresponding cooling channel, and wherein each circumferentially extending portion extends parallel to the outer surface of the airfoil wall and is located proximate a stagnation point of the airfoil.

16. The method of claim 15, wherein the plurality of first cooling channels includes an upper first cooling channel and a lower first cooling channel, and wherein the plurality of second cooling channels includes an upper second cooling channel and a lower second cooling channel, the method further comprising staggering the plurality of first cooling channels and the plurality of second cooling channels such that the upper second cooling channel is located between, in a radial direction of the airfoil, the upper first cooling channel and the lower first cooling channel, and such that the lower first cooling channel is located between, in the radial direction of the airfoil, the upper second cooling channel and the lower second cooling channel.

17. The method of claim 15 further comprising continually tapering each of the plurality of first cooling channels and the plurality of second cooling channels along its respective entire downstream length.

18. The method of claim 15, further comprising:

forming each of the plurality of first cooling channels with a first flared outlet transition portion proximate the second opening;

forming each of the plurality of second cooling channels with a second flared outlet transition portion proximate the fourth opening;

continually tapering each of the plurality of first cooling channels from the first opening to an inlet of the first flared outlet transition portion; and continually tapering each of the plurality of second cooling channels from the third opening to an inlet of the second flared outlet transition portion.

19. The method of claim 15, further comprising:

forming each of the plurality of first cooling channels with a first inlet transition portion, a first axially extending portion, a first outwardly turning portion, and a first outlet transition portion; and forming each of the plurality of second cooling channels with a second inlet transition portion, a second axially extending portion, a second outwardly turning portion, and a second outlet transition portion.

* * * * *